US012134746B2

(12) United States Patent
Devine et al.

(10) Patent No.: US 12,134,746 B2
(45) Date of Patent: Nov. 5, 2024

(54) MODULAR VERTICAL SEED CONDITIONER HEATING SECTION

(71) Applicant: Crown Iron Works Company, Blaine, MN (US)

(72) Inventors: Jesse Lynn Devine, Garretson, SD (US); Corey Alan Paulson, New Brighton, MN (US); Benjamin Wayne Floan, Andover, MN (US)

(73) Assignee: CROWN IRON WORKS COMPANY, Blaine, MN (US)

( * ) Notice: Subject to any disclaimer, the term of this patent is extended or adjusted under 35 U.S.C. 154(b) by 0 days.

(21) Appl. No.: 16/480,609

(22) PCT Filed: Jan. 24, 2017

(86) PCT No.: PCT/US2017/014721
§ 371 (c)(1),
(2) Date: Jul. 24, 2019

(87) PCT Pub. No.: WO2018/139987
PCT Pub. Date: Aug. 2, 2018

(65) Prior Publication Data

US 2019/0382683 A1 Dec. 19, 2019

(51) Int. Cl.
*F26B 17/12* (2006.01)
*C11B 1/04* (2006.01)
(Continued)

(52) U.S. Cl.
CPC ................ *C11B 1/04* (2013.01); *F26B 17/12* (2013.01); *F26B 23/10* (2013.01);
(Continued)

(58) Field of Classification Search
CPC ...... F28F 2280/00; F28F 2280/10; F28F 1/02; F28D 2021/0042; F28D 2015/0216; F28D 7/1615; F28D 1/05383
See application file for complete search history.

(56) References Cited

U.S. PATENT DOCUMENTS 731,682 A 6/1903 Hillig
1,425,273 A * 8/1922 Robert ................ F28D 21/0007
165/109.1
(Continued)

FOREIGN PATENT DOCUMENTS

CA 2851781 A1 11/2015
CA 2857852 A1 1/2016
(Continued)

OTHER PUBLICATIONS

"Vertical Seed Conditioner," Crown Iron Works Company, Feb. 1, 2010, Retrieved from the Internet <http://web.archive.org/web/20161231015754/http:/www.crowniron.com/assets/library/brochures/USA/preparation/VSC_Brochure.pdf>, on Feb. 26, 2019, 6 pages.
(Continued)

*Primary Examiner* — Paul Alvare
(74) *Attorney, Agent, or Firm* — Fredrikson & Byron, P.A.

(57) ABSTRACT

A vertical seed conditioner may be formed of a plurality of sections that can be individually removed for repair and/or replacement without requiring the entire seed conditioner be permanently decommissioned. For example, the seed conditioner may be formed of a plurality of heat transfer sections stacked vertically with respect to each other to form the conditioning vessel. Each heat transfer section may include an inlet manifold, an outlet manifold, and multiple heat transfer tubes extending from the inlet manifold to the outlet manifold. The multiple heat transfer tubes may be
(Continued)

spaced from each other to provide a gap between adjacent tubes through which the granular solid can travel.

20 Claims, 6 Drawing Sheets

(51) Int. Cl.

| | |
|---|---|
| ***F26B 23/10*** | (2006.01) |
| ***F28D 1/053*** | (2006.01) |
| ***F28D 7/16*** | (2006.01) |
| ***F28D 15/02*** | (2006.01) |
| ***F28D 15/06*** | (2006.01) |
| *F28D 21/00* | (2006.01) |
| *F28F 1/02* | (2006.01) |

(52) U.S. Cl.
CPC ....... *F28D 1/05383* (2013.01); *F28D 7/1615* (2013.01); *F28D 15/0275* (2013.01); *F28D 15/06* (2013.01); *F28D 2015/0216* (2013.01); *F28D 2021/0042* (2013.01); *F28F 1/02* (2013.01); *F28F 2210/10* (2013.01); *F28F 2280/00* (2013.01)

(56) References Cited

U.S. PATENT DOCUMENTS

| | | | | |
|---|---|---|---|---|
| 1,528,696 | A | 3/1925 | Robinson | |
| 1,780,294 | A * | 11/1930 | Davis, Jr. | F28F 9/00 165/82 |
| 1,949,427 | A | 3/1934 | McComb | |
| 2,060,581 | A | 11/1936 | Laessig | |
| 2,099,634 | A | 11/1937 | Thorp et al. | |
| 2,422,102 | A | 6/1947 | Kline | |
| 2,615,687 | A * | 10/1952 | Simmons | F28D 1/05316 165/149 |
| 3,447,598 | A * | 6/1969 | Kaess, Jr. | F28F 9/013 165/122 |
| 4,456,556 | A | 6/1984 | Grimsby | |
| 4,458,750 | A * | 7/1984 | Huber | F28F 9/0278 165/174 |
| 4,556,573 | A | 12/1985 | Bartesch et al. | |
| 4,581,238 | A | 4/1986 | White et al. | |
| 4,837,946 | A * | 6/1989 | Hella | B65H 23/24 226/196.1 |
| 4,869,910 | A | 9/1989 | Givens et al. | |
| 4,944,954 | A | 7/1990 | Strop et al. | |
| 5,386,764 | A | 2/1995 | Ratajczek | |
| 5,727,689 | A * | 3/1998 | Anderson | B02B 1/08 209/139.1 |
| 5,884,416 | A | 3/1999 | Anderson | |
| 6,518,443 | B1 | 2/2003 | Beyer et al. | |
| 7,021,572 | B2 | 4/2006 | Heeb et al. | |
| 7,458,340 | B2 * | 12/2008 | Takeda | F24H 8/00 122/31.1 |
| 7,615,657 | B2 | 11/2009 | Bathurst et al. | |
| 8,578,624 | B2 | 11/2013 | Jordison et al. | |
| 8,757,524 | B2 | 6/2014 | Mosman | |
| 9,459,054 | B2 | 10/2016 | Huang et al. | |
| 9,562,194 | B2 | 2/2017 | Kellens et al. | |
| 9,638,478 | B2 | 5/2017 | Byman | |
| 9,683,781 | B2 | 6/2017 | Byman | |
| 10,612,855 | B2 * | 4/2020 | Kolb | F28D 1/0417 |
| 2004/0065073 | A1 * | 4/2004 | Nash | F28D 9/0043 60/39.511 |
| 2007/0116814 | A1 | 5/2007 | Shirataka | |
| 2012/0196239 | A1 | 8/2012 | Hamel | |
| 2012/0292004 | A1 * | 11/2012 | Chen | F24S 10/742 165/175 |
| 2013/0292093 | A1 | 11/2013 | Huang et al. | |
| 2014/0246184 | A1 | 9/2014 | Byman et al. | |
| 2015/0240184 | A1 | 8/2015 | Le Clef | |
| 2016/0076813 | A1 | 3/2016 | Skold et al. | |
| 2018/0077866 | A1 | 3/2018 | Perez et al. | |
| 2018/0112926 | A1 | 4/2018 | Byman | |
| 2018/0178473 | A1 | 6/2018 | Perez et al. | |
| 2018/0273876 | A1 | 9/2018 | Paulson et al. | |

FOREIGN PATENT DOCUMENTS

| | | | |
|---|---|---|---|
| CN | 105841472 | A | 8/2016 |
| EP | 1074605 | B1 | 8/2003 |
| EP | 2062963 | A2 | 5/2009 |
| FR | 2369525 | A1 | 5/1978 |
| FR | 2539586 | A1 | 7/1984 |
| WO | 2017024374 | A1 | 2/2017 |
| WO | 2018139987 | A1 | 8/2018 |

OTHER PUBLICATIONS

"Hot Dehulling", Crown Iron Works Company, Oct. 2014, Retrieved from the Internet: <URL: https://www.crowniron.com/asset s/library/brochures/USA/preparation/Crown%20Hot%20Dehulling%20SS_OCT14.pdf>, 2 pgs.
International Application No. PCT/US2017/014721, International Search Report and Written Opinion dated Oct. 24, 2017, 13 pgs.
EP Pat. App. No. 17894514.3, European Search Report dated Aug. 24, 2020, 7 pages.

* cited by examiner

MODULAR VERTICAL SEED CONDITIONER HEATING SECTION

CROSS-REFERENCE

This application is a 35 U.S.C. 371 national phase filing from International Application No. PCT/US2017/014721, filed Jan. 24, 2017, the entire contents of which are incorporated herein by reference.

TECHNICAL FIELD

This disclosure relates to relates to systems for conditioning and processing granular matter.

BACKGROUND

Oil seeds and beans provide a natural and renewable source of oil for a variety of end use applications. To extract oil from oleaginous matter, the oleaginous matter is first harvested and transported to an oil extraction facility. Upon arriving at the oil extraction facility, the oleaginous matter may either be placed in storage or, depending on the setup of the facility, sent to a dryer to remove excess moisture. Typically, the oleaginous matter is then cleaned to remove foreign matter that will negatively affect downstream crushing and, if containing a hull, dehulled to expose and release the oil-bearing portion of the oleaginous matter.

Once suitably processed, the oleaginous matter is pre-heated and flaked. Pre-heating the oleaginous material can condition the material to enable de-hulling and facilitate subsequent solvent extraction. For example, typical processing steps performed on a soy bean feedstock include cleaning the soy beans, conditioning the soy beans in a pre-heater, cracking the soy beans, aspirating the cracked soy beans, and then flaking the cracked soy beans prior to solvent extraction. For some soft oleaginous materials such as rapeseed and canola, the material may be heat conditioned a second time before performing solvent extraction.

After conditioning and flaking, the flaked material is usually cooked to reduce the viscosity of the oil in the oleaginous matter and to make the oil easier to separate from the remaining portion of the matter. Subsequently, the cooked oleaginous matter is pressed to extract the oil from the matter. During mechanical pressing, the cooked oleaginous matter is squeezed under pressure to separate liquid oil from a resulting cake. Modern press machines generally remove fifty to sixty percent of the oil in the cooked oleaginous matter. Depending on the application, the resulting cake is sent to a solvent extractor where residual oil is removed from the cake using solvent extraction.

In practice, the step of preheating oleaginous matter for subsequent processing may be performed in a conditioning apparatus. The conditioning apparatus may be a closed vessel through which the oleaginous matter is transported in a countercurrent direction relative to an air steam. The oleaginous matter may be heated in the conditioning apparatus as it travels through the vessel. Over extended service life, the interaction between the moving stream of oleaginous matter being processed and the internal heat transfer components of the conditioning apparatus can cause the heat transfer components and other contact surfaces of the vessel to wear. When the most heavily worn section of the conditioning apparatus reaches end-of-service-life, the conditioning apparatus may be difficult to repair and may need to be scrapped even though other sections of the conditioning apparatus have not reached end-of-service-life.

SUMMARY

In general, this disclosure is directed to seed conditioner systems and related methods of making and using such seed conditioner systems. In some examples, a seed conditioner system is implemented as a modular structure composed of multiple individual sections vertically stacked one on top of the other which, in combination, form the seed conditioner vessel. For example, each modular section may have an inlet manifold, an outlet manifold, and multiple heat transfer tubes in fluid communication with the inlet and outlet manifolds, respectively. The inlet and outlet manifolds may form inner wall surfaces of the seed conditioner vessel, e.g., such that multiple manifolds of different modular sections stacked one on top of another collectively define the interior wall of the vessel. Each modular section may be individually replaceable such that individual sections of the seed conditioner can be replaced without scrapping the whole vessel as that individual section wears. This may allow individual sections of the vessel to be fabricated from less robust materials (e.g., carbon steel) then if the vessel were not formed of replaceable sections (e.g., stainless steel).

In some configurations, the seed conditioner includes a frame to which the modular heat transfer sections can be attached. In addition to attaching heat transfer sections to the frame, other modules can be attached to the frame such as air inlets, exhaust outlets, and/or blank modules devoid of heat transfer tubing or inlets/outlets. The frame can provide a primary support structure to which different modular units can be attached, with non-heat transfer units being attached above, below, and/or between modular heat transfer units.

To replace an individual section of the seed conditioner, the modular section(s) above that section being replaced can be vertically elevated. The section being replaced can be pulled horizontally out of the vertical seed conditioner. In some examples, a newly fabricated section is inserted horizontally into the space vacated by the removed section, e.g., and the sections above the replaced section vertically lowered onto the new section. In other examples, the section being replaced is rotated 180 degrees, e.g., such that the leading side of the section first contacting downwardly flowing granular matter is flipped with the trailing side of the section becoming the leading side. This can extend the service life of the modular section before complete replacement.

In one example, a seed conditioner is described that includes a plurality of heat transfer sections stacked vertically with respect to each other to form a conditioning vessel configured to thermally process granular solid. The example specifies that each of the heat transfer sections include an inlet manifold configured to receive a thermal transfer fluid, an outlet manifold configured to discharge the thermal transfer fluid, and multiple heat transfer tubes extending from the inlet manifold to the outlet manifold. The example further specifies that the tubes provide fluid communication between the inlet and outlet manifolds and that the tubes are spaced from each other to provide a gap between adjacent tubes through which the granular solid can travel.

The details of one or more examples are set forth in the accompanying drawings and the description below. Other features, objects, and advantages will be apparent from the description and drawings, and from the claims.

DETAILED DESCRIPTION

This disclosure generally relates to conditioning vessel systems and techniques, such as conditioning vessels used to process seeds or other granular matter before further processing. The granular matter can be heated and dried in the conditioning vessel as it moves through the vessel. The conditioning vessel may be configured as a shell and tube structure having tubes of smaller cross-sectional area (e.g., diameter) passing through the interior of the shell. In operation, the granular matter can flow on the shell side of the conditioning vessel while a thermal transfer fluid passes through the tube side of the vessel, thereby heating the granular matter. The conditioning vessel may be constructed of multiple modular sections stacked one on top of another, each of which has individual thermal fluid inlet and outlets. Accordingly, depending on the mode of operation, the same thermal transfer fluid may be supplied to each of the modular sections (e.g., flowing from one section to a vertically elevated section countercurrent to the direction of material travel), or different thermal transfer fluids may be supplied to different sections.

Figure 1:
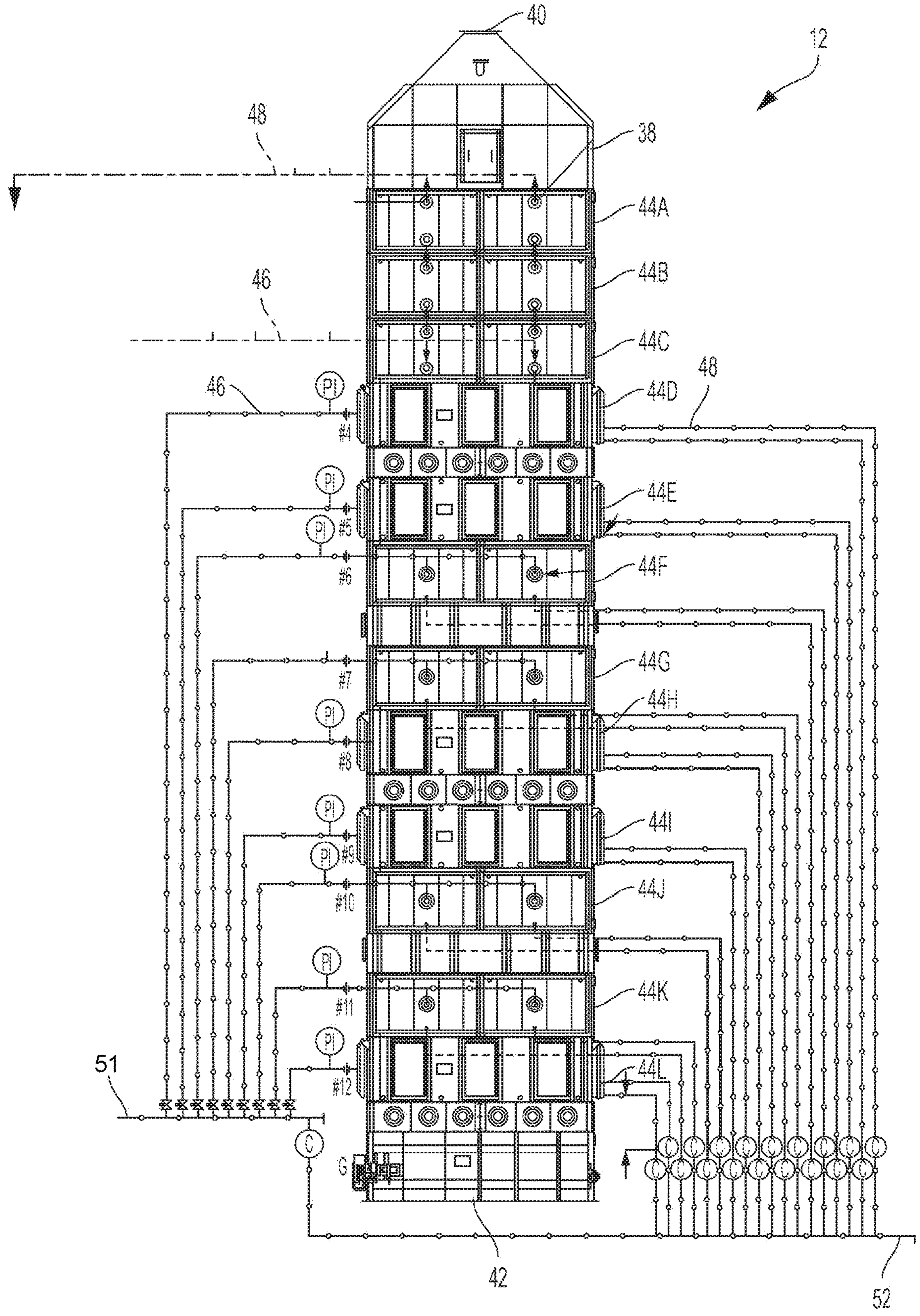
FIG. 1 is an illustration of an example configuration of a conditioning vessel that may be fabricated using multiple modular sections according to the disclosure.

FIG. 1 is an illustration of an example conditioning vessel 10 that may be fabricated from different modular sections as described herein. In the illustrated example, conditioning vessel 12 is shown as having a shell 38 forming an inlet opening 40 through which solid feed material is introduced into the conditioning vessel and a discharge opening 42 through which conditioned solid material is discharged from the vessel. Conditioning vessel 12 also includes a plurality of heat transfer stages 44A-44L positioned between inlet opening 40 and discharge opening 42. Each heat transfer stage 44 may be configured to receive a heat transfer fluid and pass the heat transfer fluid through the heat transfer stage while solid feed material flows though shell 38. As discussed in greater detail with respect to FIGS. 3 and 4, each heat transfer stage 44 may be fabricated from one or more modular tube sections stacked vertically one on top of another to form the heat transfer stage and, correspondingly, vessel 38.

In the configuration of FIG. 1, inlet opening 40 is positioned at a vertically elevated location with respect to gravity relative to discharge opening 42. Further, heat transfer stages 44A-44L are stacked one on top of another to provide a vertically stacked array of heat transfer stages. In operation, solid feed material can flow under a force of gravity from inlet opening 40 to discharge opening 42. In some configurations, air (which may or may not be heated) is also passed through shell 38 to help fluidize solid feed material 24 and to increase the flow through conditioning vessel 12.

Each heat transfer stage 44 can have one or more inlets 46 through which a heat transfer fluid is introduced into the heat transfer stage and one or more outlets 48 through which the heat transfer fluid is discharged from the heat transfer stage. In different configurations, a heat transfer fluid may be passed through only a single stage before being recycled/discarded or may be passed through multiple stages before being recycled/discarded. For example, in the configuration of FIG. 1, heat transfer stages 44D-44L are illustrated as being connected to a common heat transfer fluid header (e.g., steam header) 51. Heat transfer fluid is passed from heat transfer fluid header 51, through a single heat transfer stage of heat transfer stages 44D-44L (with each heat transfer stage receiving heat transfer fluid), and then collected in a common heat transfer fluid return header 52. By contrast, heat transfer stages 44A-44C are supplied with a shared heat transfer fluid that flows in a counter current direction to the direction solid feed material 24 flows. For example, heat transfer fluid can enter at heat transfer stage 44C, flow from heat transfer stage 44C to and through heat transfer stage 44B, and then flow to and through heat transfer stage 44A. It should be appreciated that FIG. 1 illustrates one example configuration of heat transfer stages that can be used for conditioning vessel 12, and the disclosure is not limited in this respect. For example, conditioning vessel 12 may have fewer heat transfer stages 44 (e.g., two, three, four) or more heat transfer stages than is illustrated.

Independent of the specific configuration of conditioning vessel 12, the conditioning vessel is configured to receive one or more heat transfer fluids to heat solid material passing through the conditioning vessel. In some examples, one or more heat transfer stages is connected to a first heat transfer fluid source and one or more other heat transfer stages is connected to a second heat transfer fluid source different than the first heat transfer fluid source. For example, conditioning vessel 12 may be implemented so that at least one heat transfer section receives the first heat transfer fluid and at least one other heat transfer stage receives the second heat transfer fluid. The heat transfer stage receiving the first heat transfer fluid may be a vertically lower stage relative to the other heat transfer stage receiving the second heat transfer fluid.

In some examples, the first heat transfer fluid is at a higher temperature and/or contains more thermal energy than the second heat transfer fluid. For example, the first heat transfer fluid may be a gas (e.g., steam) while the second heat transfer fluid may be a liquid (e.g., heated aqueous stream). As another example, the first heat transfer fluid may be at a higher pressure than the second heat transfer fluid. Supplying a second heat transfer fluid to one or more lower heat transfer stages that is at a higher temperature than a first heat transfer fluid supplied to one or more upper heat transfer stages may be useful because the granular material traveling through the lower stages will be hotter than in the upper stages. This is due to the thermal transfer to the granular matter that occurred in the upper stages of conditioning vessel 12. Accordingly, by supplying the hotter material to lower stages, a larger thermal gradient may be created between heat transfer fluid and the material being heated, increasing the heat transfer efficiency as compared to if a cooler thermal transfer fluid was used in the lower stages.

That being said, in other configurations, a single heat transfer fluid may be used for all stages of the conditioning vessel.

Each heat transfer stage 44 of conditioning vessel 12 may be a bounded region within or extending through conditioning vessel 12 through which a heat transfer fluid (e.g., gaseous stream 30) travels on one side and solid feed material 24 travels on an opposite side. For example, each heat transfer stage may be formed by a group of tubes arranged parallel to each other (e.g., within a common horizontal plan) and in fluid communication with each other. Groups of tubes in different planes (e.g., different horizontal planes located at vertically spaced apart locations relative to each other) may form different heat transfer stages. Thermal energy can transfer via conduction through material surfaces separating the thermal transfer fluid from solid feed material 24. For example, thermal energy may transfer through a tube separating the thermal transfer fluid from solid feed material 24 in a shell and tube arrangement. As another example, thermal energy may transfer through a plate separating the thermal transfer fluid from solid feed material 24 in a plate and frame arrangement.

In some examples, conditioning vessel 12 is configured to heat a solid feed material being processed to a temperature ranging from 25 degrees Celsius to 80 degrees Celsius, such as a temperature ranging from 40 degrees Celsius to 70 degrees Celsius. While the temperature of incoming feed material may vary, e.g., based on storage and ambient temperature conditions, in some examples, incoming feed material is at a temperature less than 40 degrees Celsius, such as less than 20 degrees Celsius, less than 10 degrees Celsius, or even less than 0 degrees Celsius (e.g., less than −10 degrees Celsius). In general, the heat transfer efficiency of conditioning vessel 12 may increase as the temperature difference between the incoming feed material and the transfer fluid(s) introduced into conditioning vessel 12 increases. In some applications, the temperature difference between the incoming feed material and the thermal transfer fluid(s) is greater than 70 degrees Celsius, such as a temperature difference ranging from 80 degrees Celsius to 130 degrees Celsius.

Conditioning vessel 12 can be configured to indirectly heat solid material being processed by passing the solid feed material though a conveyance chamber divided from one or more separate chambers though which heat transfer fluid passes. For example, each heat transfer stage 44 of conditioning vessel 12 may be a bounded region within or extending through conditioning vessel 12 through which a heat transfer fluid travels on one side and the solid feed material travels on an opposite side. For example, each heat transfer stage may be formed by a group of tubes arranged parallel to each other (e.g., within a common horizontal plane) and in fluid communication with each other. Groups of tubes in different planes (e.g., different horizontal planes located at vertically spaced apart locations relative to each other) may form different heat transfer stages. Thermal energy can transfer via conduction through material surfaces separating the thermal transfer fluid from the solid feed material. For example, thermal energy may transfer through a tube separating the thermal transfer fluid from the solid feed material in a shell and tube arrangement.

Figure 2:
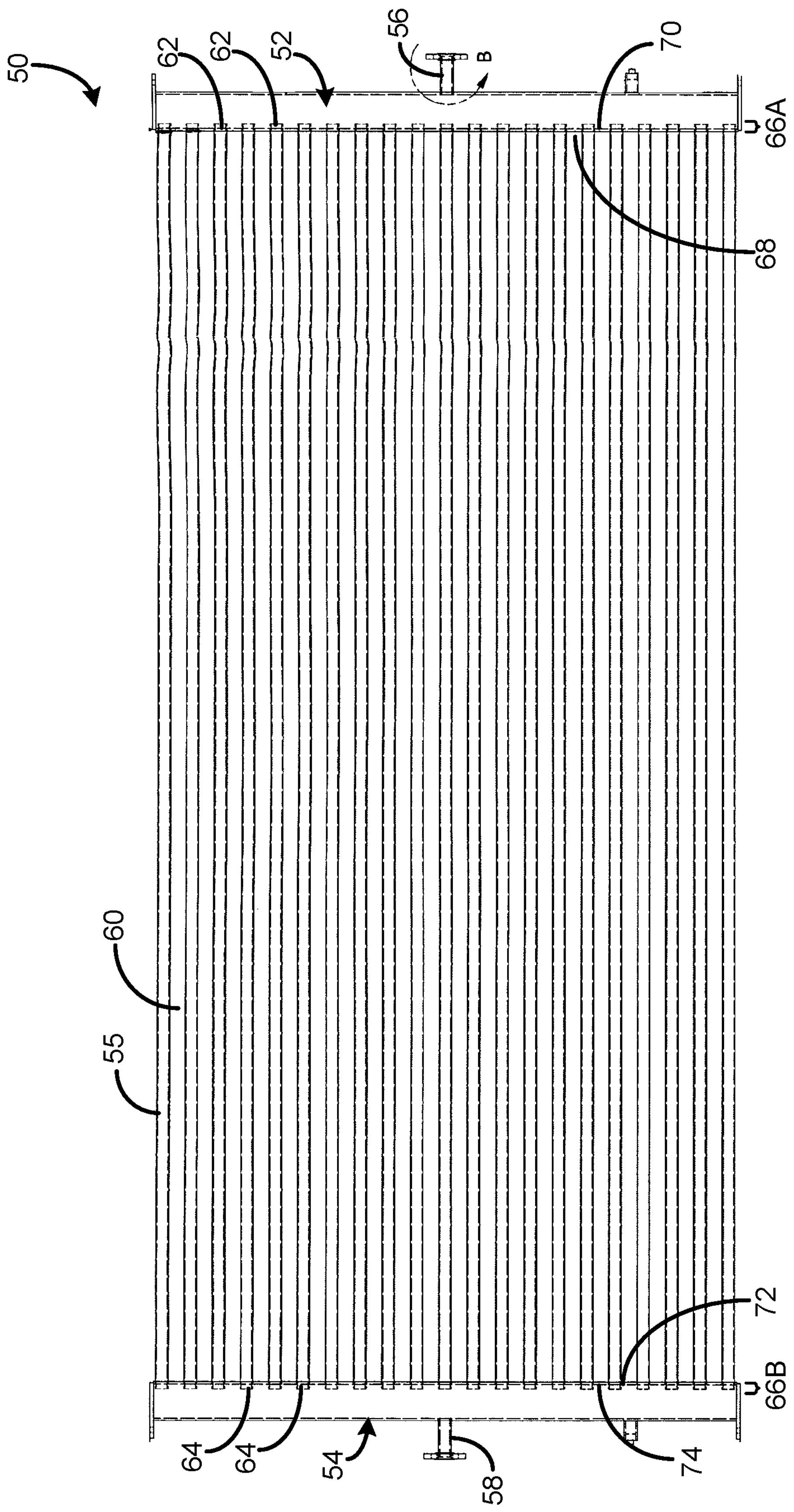
FIG. 2 is a top view illustration of an example heat transfer section that can be used in the example conditioning vessel of FIG. 1.

FIG. 2 is a top view illustration of an example heat transfer section 50 that can be used in conditioning vessel 12. Heat transfer section 50 may form all or a portion of a heat transfer stage 44 in conditioning vessel 12. For example, each heat transfer stage 44 and/or conditioning vessel 12 may be formed by stacking multiple heat transfer sections 50 vertically one on top of another to form the heat transfer stage and/or conditioning vessel. Each heat transfer section 50 may be a modular tube group having a common thermal transfer fluid inlet and common thermal transfer fluid outlet. In practice, an individual heat transfer section 50 may be removed from conditioning vessel 12, e.g., to facilitate repair or replacement of the tube section, without requiring the entire vessel to be repaired or replaced.

In the example of FIG. 2, heat transfer section 50 includes an inlet manifold 52, at the outlet manifold 54, and multiple heat transfer tubes 55 extending between the inlet manifold and the outlet manifold. Inlet manifold 52 includes an inlet 56 that can be connected to a heat transfer fluid source to introduce a heat transfer fluid into the heat transfer tubes. Outlet manifold 54 includes an outlet 58 from which he transfer fluid having passed through heat transfer tubes 55 discharges. Adjacent heat transfer tubes 55 are spaced from each other with a gap 60 between adjacent tubes. In operation, granular material being processed can flow through gap 60 between adjacent tubes, allowing the granular material to travel through conditioning vessel 12 while also being heated by heat transfer fluid passing through the tubes.

Inlet manifold 52 may be an enclosed chamber in fluid communication with tubes 55. For example, inlet manifold 52 may be a bounded chamber having one inlet 56 and multiple outlets 62 corresponding to the ends of each of the heat transfer tubes 55. Thermal transfer fluid can enter inlet manifold 52 via inlet 56, distribute across the manifold, and discharge the manifold into the outlet openings 62 of each of the heat transfer tubes 55.

Outlet manifold 54 may also be an enclosed chamber in fluid communication with tubes 55. For example, outlet manifold 54 may be a bounded chamber having a plurality of inlets 64 corresponding to the ends of each of the heat transfer tubes 55 and one outlet 58. Thermal transfer fluid can enter outlet manifold 54 from the plurality of heat transfer tubes 55 via inlets 64 and subsequently discharge from the manifold the outlet 58.

In the illustrated configuration, inlet 56 and outlet 58 are centered laterally along the width of inlet manifold 52 and outlet manifold 54, respectively, although may be offset relative to center in other configurations. In some examples, inlet 56 and outlet 58 are oriented at the same height on each heat transfer section 50. In other examples, inlet 56 is vertically offset from outlet 58. For example, inlet 54 may be positioned at a higher vertical location than outlet 58 on heat transfer section 50, e.g., such as positioning the inlet adjacent the uppermost end of the heat transfer section and positioning the outlet adjacent the lowermost end of the heat transfer section. This can be useful to facilitate downward flow of heat transfer fluid and/or condensate.

In addition to inlet 56 and outlet 58, inlet manifold 52 and/or outlet manifold 54 may have one or more other openings to receive a measurement probe (e.g., temperature and/or pressure sensor), provide venting, or otherwise allow access to the inlet manifold and/or outlet manifold. In one example, inlet manifold 52 and outlet manifold 54 each have a port configured to which a thermostatic air vent is attached. The thermostatic air vent can be used to remove air or other non-condensable gases displaced by a heat transfer fluid introduced into the manifolds.

In yet additional examples, heat transfer section 50 may include an extension member (e.g., jack, turnbuckle) that increases compression across the inlet and outlet manifolds. This can help improve sealing and increase structural rigidity from the upper flange to the lower flange of the section assembly.

In the illustrated configuration, the plurality of heat transfer tubes 55 are illustrated as having opposed terminal ends 66A and 66B. A first terminal end 66A of each of the tubes projects into inlet manifold 52 while an opposed second terminal end 66B of each of the tubes projects into outlet manifold 54. In other configurations, first terminal end 66A and/or second terminal end 66B may be flush with the wall surface of inlet manifold 52 and/or outlet manifold 54, respectively. In either configuration, heat transfer tubes 55 may be mechanically joined to inlet manifold 52 and outlet manifold 54 to prevent heat transfer fluid from leaking into the gap space 60 between the heat transfer tubes. In some examples, heat transfer tubes 55 are welded to inlet manifold 52 and outlet manifold 54 about their circumference to form a sealed joint between the tubes and the respective manifolds.

Heat transfer tubes 55 may have any suitable size and shape. In general, the length of heat transfer tubes 55 may vary depending on the size of conditioning vessel 12. In different examples, heat transfer tubes 55 may have a square, rectangular, oval, circular, elliptical, or other arcuate or polygonal cross-sectional shape. In some examples, inlet manifold 52 and outlet manifold 54 are formed of square sections of tube while heat transfer tubes 55 have an oval or other circular cross-sectional shape. Although the cross-sectional size of heat transfer tubes 55 may also vary depending on the size of conditioning vessel 12, in some examples, the size of the tubes are controlled, e.g., based on heat transfer rates, pressure code standards, or other factors. In some examples, each heat transfer tube 55 has a cross-sectional diameter less than 6 inches, such as less than 4 inches. This may be useful to implement heat transfer tubes 55 without invoking certain pressure code standards required for larger pressure vessels. That being said, in other configurations, heat transfer tubes 55 may be larger.

Inlet manifold 52, outlet manifold 54, and heat transfer tubes 55 may each be fabricated from any suitable materials. Because of the harsh environment in which conditioning apparatuses typically operate, typical materials of construction include chemically and/or thermally resistant materials such as stainless steel. Because heat transfer section 50 may be removed from conditioning vessel 12, for example for repair or replacement, the components of heat transfer section 50 may in some examples be formed of comparatively less resistant materials than typical materials of construction. In some examples, inlet manifold 52, outlet manifold 54, and/or heat transfer tubes 55 may be fabricated from carbon steel in lieu of more expensive stainless steel or other similar materials.

As mentioned, different heat transfer sections 50 may be stacked vertically one on top of another to form conditioning vessel 12 or a portion thereof. In the example of FIG. 2, inlet manifold 52 defines an inner surface 68 and an outer surface 70 on opposite lateral sides of the manifold. Similarly, outlet manifold 54 defines an inner surface 72 and an outer surface 74 on opposite lateral sides of the manifold. In this configuration, the inner surfaces 68 and 72 of inlet manifold 52 and outlet manifold 54, respectively, form internal walls of conditioning vessel 12 once heat transfer section 50 are installed together. Accordingly, during operation, granular material flowing through conditioning vessel 12 can flow through gaps 60 between adjacent tubes, contacting the external wall surfaces of tubes 55 and the internal wall surfaces of the conditioning vessel formed by inner surfaces 68 and 72 of inlet manifold 52 and outlet manifold 54, respectively. Each heat transfer section may have solid wall surfaces connecting inner surfaces 68 and 72 to each other, thereby bounding the interior cavity of the heat transfer section and, correspondingly, the conditioning vessel formed from the heat transfer section.

Figure 3:
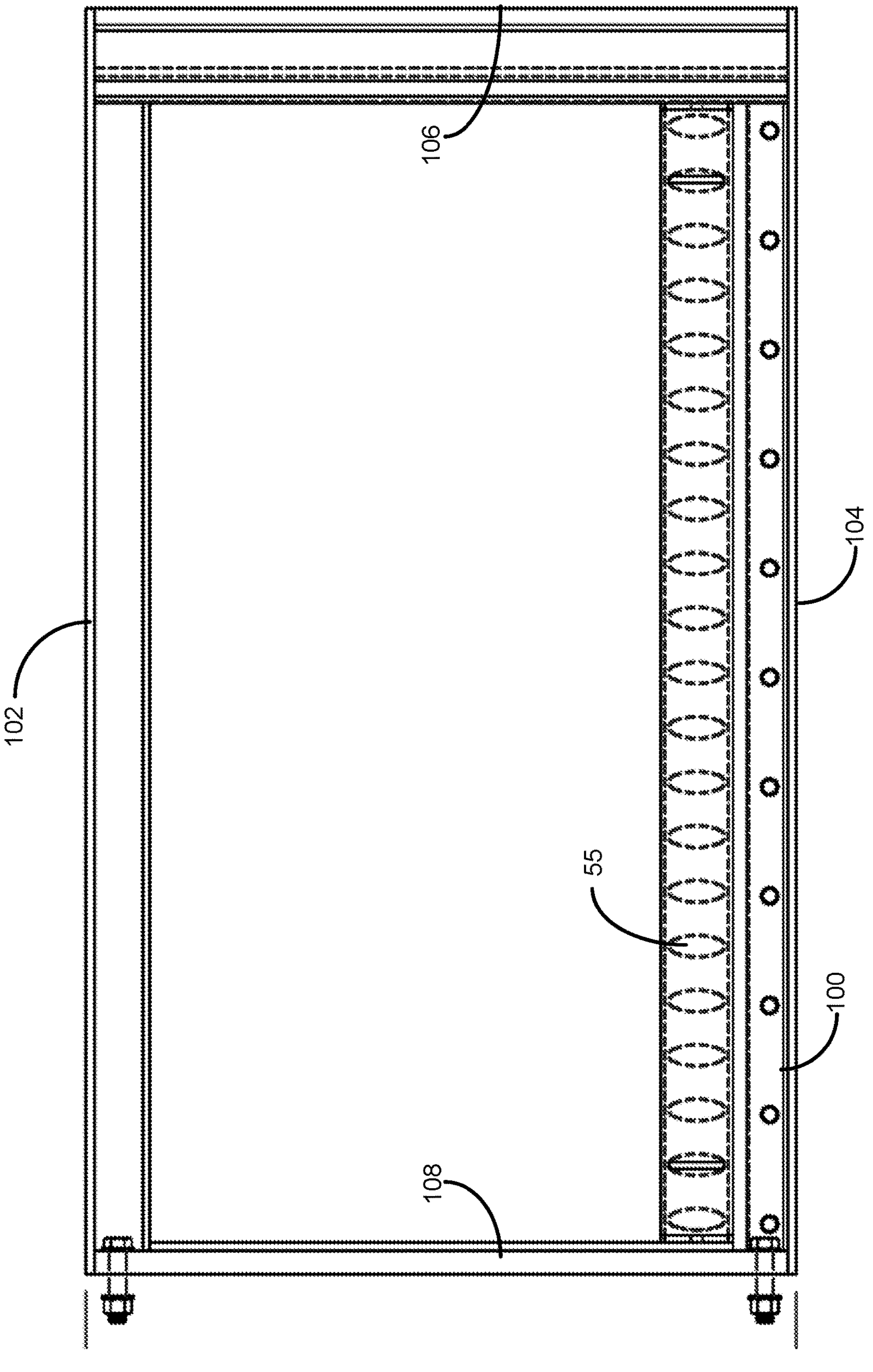
FIG. 3 is a side view of an example heat transfer section frame that can be used to hold multiple tube rows to form a heat transfer section that can be used in the example conditioning vessel of FIG. 1.

In different examples, a modular heat transfer section 50 according to the disclosure may have a single row of tubes or may have multiple rows of tubes. FIG. 3 is a side view of an example heat transfer section frame 100 that can be used to hold multiple modules, where each module is multiple rows of tubes, an air inlet, an exhaust outlet, or a blank section. In the illustrated configuration, heat transfer section frame 100 includes an upper support member 102, a lower support member 104, and lateral support members 106 and 108. Individual rows of tubes may be positioned in heat transfer section frame 100 to provide a vertically stacked set of tubes. Inlet manifold 52 (FIG. 2) and outlet manifold 54 may be in fluid communication with all tubes held within frame 100. That is, instead of configuring a single row of tubes with a dedicated inlet manifold and outlet manifold, multiple rows of tubes held within frame 100 may be connected to a shared inlet manifold and a shared outlet manifold. Each row of tubes may be arranged relative to the inlet manifold and the outlet manifold as discussed above with respect to FIG. 2.

Where a heat transfer section 50 includes multiple vertically stacked rows of tubes, the heat transfer section can have any suitable number of rows of tubes. In some examples, heat transfer section 50 includes at least two rows of tubes, such as at least three rows of tubes, at least four rows of tubes, or at least five rows of tubes. For example, heat transfer section 50 may have from 2 rows of tubes to 10 rows of tubes, such as from three rows of tubes to five rows of tubes. Each row of tubes may have multiple coplanar tubes. For example, each row of tubes may be composed of at least two tubes 55 extending from inlet manifold 52 to outlet manifold 54, such as at least 5 tubes, or at least 10 tubes. As examples, each row of tubes may have from 5 tubes to 25 tubes.

Within each heat transfer section 50, tubes in different vertically stacked rows may be aligned with each other (e.g., such that gaps 60 between adjacent tubes are aligned) or may be laterally offset relative to each other. Offsetting adjacent vertical rows of tubes relative to each other may be useful to create a tortuous pathway between one row of tubes relative to a vertically lower row of tubes. This can increase the residence time and amount of thermal transfer to the granular material as compared to if there is a direct vertical pathway through different rows of tubes.

Figure 4A:
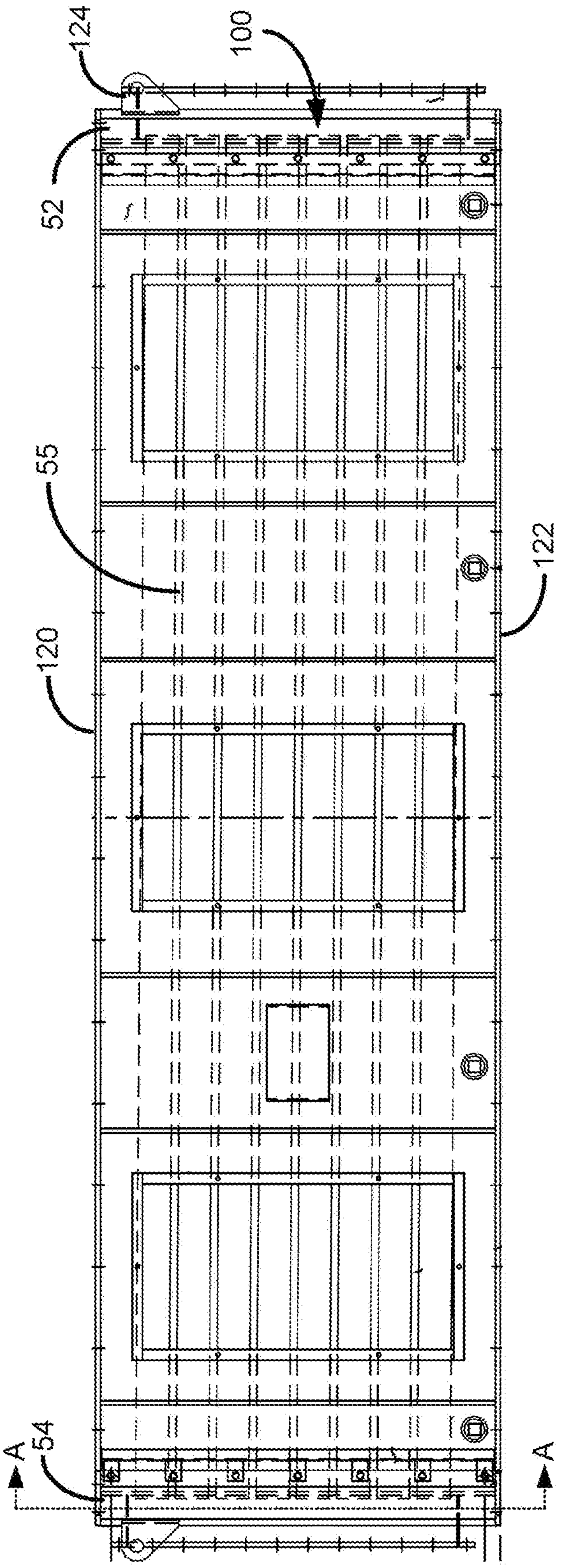
FIG. 4A is a side view of an example heat transfer section having a plurality of rows of tubes.
Figure 4B:
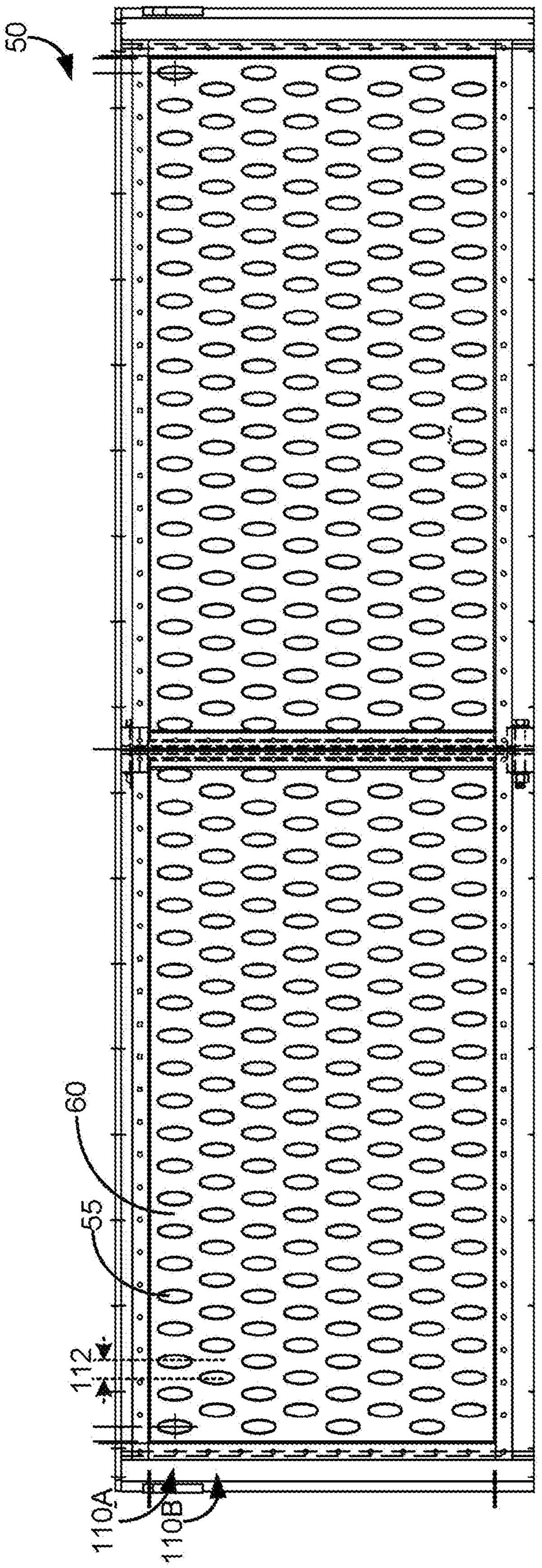
FIG. 4B is a side view of the example heat transfer section from FIG. 4A taken along the A-A line indicated on FIG. 4A.

FIGS. 4A and 4B are two different side views of an example heat transfer section 50 that may be used to form conditioning vessel 12 according to the disclosure. FIG. 4A is a side view of an example heat transfer section 50 having a plurality of rows of tubes 55, which in the illustrated example are shown as being implemented with eight rows of tubes. The heat transfer section 50 in this example includes an inlet manifold 52 and an outlet manifold 54 in fluid communication with all tubes in the heat transfer section. Each row of tubes 55 is stacked vertically on each other row of tubes to produce a vertically stacked tube arrangement.

FIG. 4B is a side view of heat transfer section 50 from FIG. 4A taken along the A-A line indicated on FIG. 4A. As shown, heat transfer section 50 has multiple rows of tubes 55, including a first row 110A and a second, adjacent row 110B. The tubes 55 in this example are offset relative to each other such that adjacent rows are shifted horizontally relative to each other to create a tortuous pathway. When so configured, solid material traveling through a gap 60 between an upper tubing row 110A may not fall directly into an underlying gap 60 in a lower tubing row 110B but may instead fall on top of a tube positioned under the gap. As a result, solid material flowing through conditioning vessel 12 may need to travel both vertically downwards and horizontally back and forth between adjacent tube rows as it travels through a heating section.

In the illustrated example, tubes between adjacent rows 110A and 110B are offset a distance 112, such that the center line of an uppermost tube is coaxial with the gap 60 in the row below. In other examples, tubes 55 may be horizontally offset from upper and/lower gaps 60 different distances, or may not even be offset. Moreover, while all the tubes in heat transfer section 50 are illustrated as being horizontally aligned, in some examples, some or all of the tubes may be angularly aligned. For example, tubes 55 may be sloped downwardly in the direction the heat transfer fluid travels (e.g., such that the outlet of the tubes is at a lower elevation than the inlet of the tubes). Where a condensing heat transfer fluid is used such as steam, angling tubes 50 can be helpful to ensure that condensate forming in the tubes drains out. In some examples, tubes 55 are mounted at an angle in frame 100, such that the tubes are slanted well the upper and lower surfaces of the frame are perpendicular. Additionally or alternatively, shims may be positioned under one side of frame 100 as conditioning vessel 12 is assembled to impart a slope to tubes 55.

As briefly discussed above, each heat transfer section 50 may be a modular unit that can be combined with other heat transfer sections having the same or substantially similar configuration as heat transfer section 50 to form conditioning vessel 12 and/or other modular sections. With further reference to FIG. 4A, heat transfer section 50 includes frame 100. Frame 100 may include an upper surface 120 and a lower surface 122. To assemble conditioning vessel 12, one heat transfer section may be positioned on top of another heat transfer section, such that the lower surface 122 of an upper heat transfer section is positioned adjacent to and in contact with the upper surface 120 of a lower heat transfer section. When so assembled, the two or more heat transfer sections can form internal wall surfaces of the resulting conditioning vessel 12. In some examples, a gasket or other sealing member is positioned between adjacent heat transfer sections (e.g., in contact with upper and lower surfaces 120, 122 at the junction between the two heat transfer sections) to help seal the junction.

In some examples, such as the example illustrated in FIG. 4A, frame 100 of heat transfer section 50 includes lifting apertures 124. Lifting apertures 124 may be positioned on opposite sides of heat transfer section 50 and may be configured to mate with lifting hardware for lifting and lowering heat transfer section 50 in place. For example, lifting apertures 124 may be implemented using eye hooks, bolt openings, or other mechanical attachment locations where a lifting apparatus (e.g., crane, block and tackle) can engage the heat transfer section.

Frame 100 can have a variety of different configurations. In some examples, frame 100 is symmetric about at least one plane bisecting the frame (e.g., a horizontal plane), such as at least two planes bisecting the frame (e.g., a horizontal plane and a vertical plane). Making the frame symmetrical in one or more dimensions can be useful, e.g., for constructing and deconstructing the frame. For example, in different applications, frame 100 may be formed of structural members that are permanently joined together (e.g., via casting or welding) or may be removably connected via removable fixation members. As an example, at least some of the different structural members forming frame 100 may include bolt holes to allow the structural members to be bolted together.

When suitably configured, frame 100 or a portion thereof may be broken down into one or more subcomponents to facilitating shipment and handling logistics. For example, frame 100 may include an upper half section and a lower half section which are structurally separate but joinable using fixation members, such as bolts, on site.

To attach an individual modular section (e.g., heat transfer section) to frame 100, the modular section and frame may have corresponding fixation apertures through which fixation members (e.g., bolts) can be inserted to fixedly secure the modular section to the frame. For example, each modular section 50 may include mounting plates on opposite sides having bolt hole openings for attaching to section to opposite sides of the frame.

Figure 4C:
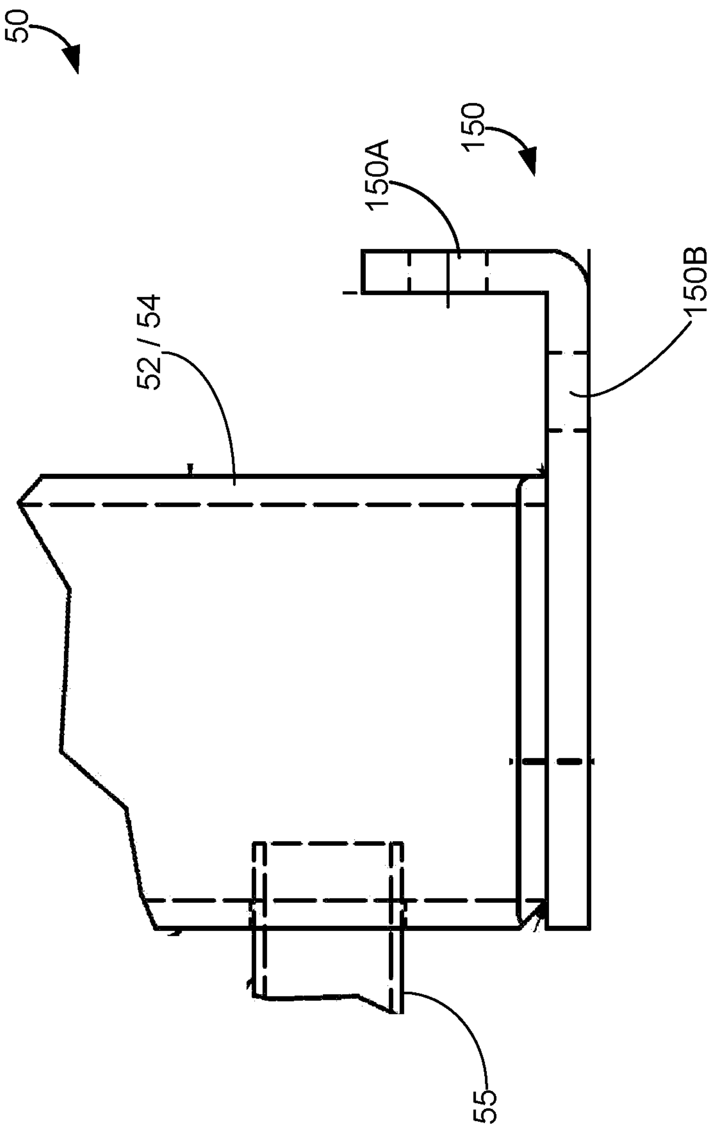
FIG. 4C illustrates an example configuration of a mounting plate that can be used on a modular section according to the disclosure.

FIG. 4C illustrates an example configuration of a mounting plate that can be used on modular section 50. In this example, mounting plate 150 is shown positioned on the end of a manifold (e.g., inlet manifold 52 or outlet manifold 54) of modular section 50. In practice, corresponding mounting plates may be positioned on opposite ends of the modular section, e.g., such as one mounting plate at each of the corners of the section. Mounting plate 150 can include at least one bolt hole, which is illustrated as two bolt holes 150A and 150B for attachment to corresponding bolt holes on frame 100. When configured with multiple bolt holes, the holes may be in the same plane or, as illustrated, arranged in multiple planes (e.g., facing different sides of the modular section) to facilitate bolt connections in multiple planes during assembly. The bolt holes on mounting plate 150 may be round and/or slotted, e.g., to facilitate translational movement between modular section 50 and frame 100 while still having a bolt securing the modular section to the frame. For example, bolt hole 150A facing the end of the modular section may be slotted to allow the tilt angle of modular section 50 to be adjusted within frame 100.

Independent of the specific configuration of heat transfer section 50 in frame 100, the heat transfer section and frame may be configured as a modular unit allowing one section to be stacked on top of another section to form conditioning vessel 12. For example, upper surface 120 and/or lower surface 122 of frame 100 may include detents, apertures, or other alignment and/or mating features that allow the lower surface of one frame to be positioned on the top surface of another frame. In some configurations, heat transfer section 50 and/or frame 100 is reversible to allow the heat transfer section to be removed from conditioning vessel 12, flipped 180 degrees, and we installed in the conditioning vessel. When so configured, upper surface 120 of the frame may become lower surface 122 and vice versa through reorientation of the heat transfer section. Such a configuration may be useful to extend the service life of the heat transfer section by allowing the more worn top surface to be inverted, exposing the last one lower surface for continued service life.

Conditioning vessel 12 can be formed of any suitable number of heat transfer sections 50. As examples, a conditioning vessel may be composed of two, three, four or more heat transfer sections (each having corresponding fames) stacked vertically on top of each other to form the conditioning vessel. For example, conditioning vessel 12 may have from two to ten heat transfer sections stacked vertically relative to each other forming the vessel. In some examples, conditioning vessel 12 also includes an air section between adjacent heat transfer sections 50. An air section may be a section formed of sidewalls devoid of apertures for thermal transfer fluid (and devoid of tubes and manifolds). The air section may be modular and attachable to frame 100 between adjacent heat transfer sections (e.g., using bolts and mounting plates 150 as discussed above).

Various examples have been described. These and other examples are within the scope of the following claims.

The invention claimed is:

1. A seed conditioner comprising:
- an inlet opening at a top of the seed conditioner configured to receive a solid feed material for conditioning;
- a discharge opening at a bottom of the seed conditioner configured to discharge the solid feed material after having undergoing conditioning; and
- a plurality of frames stacked vertically with respect to each other between the inlet opening and the discharge opening, each frame having an upper support member, a lower support member, and lateral support members connecting the upper support member to the lower support member, each frame defining an opening between the upper support member, the lower support member, and the lateral support members;
- each of the plurality of frames joining together a plurality of heat transfer sections positioned in the opening, the plurality of heat transfer sections being stacked vertically with respect to each other, each of the plurality of heat transfer sections being configured to be horizontally removed from a respective one of plurality of frames joining each of the plurality of heat transfer sections,
- wherein each of the plurality of heat transfer sections comprises an inlet manifold configured to receive a thermal transfer fluid, an outlet manifold configured to discharge the thermal transfer fluid, and multiple heat transfer tubes extending from the inlet manifold to the outlet manifold and providing fluid communication therebetween, the multiple heat transfer tubes of a respective one of the plurality of heat transfer sections being arranged in a single row and being spaced from each other to provide a gap between adjacent tubes through which the granular solid travels, as the granular solid moves from the inlet opening to the outlet opening,
- and the plurality of heat transfer sections being stacked in a respective one of the plurality of frames with the inlet manifold and the outlet manifold of adjacent heat transfer sections being in contact with each other.

2. The conditioner of claim 1, wherein the inlet manifold defines an inner surface and an outer surface, the outlet manifold defines an inner surface and an outer surface, and the inner surface of the inlet manifold and inner surface of the outlet manifold form internal walls of the seed conditioner.

3. The conditioner of claim 1, wherein
- the inlet manifold comprises a bounded chamber having one inlet configured to be placed in fluid communication with a thermal transfer fluid source and multiple outlets corresponding to each of the multiple heat transfer tubes, and
- the outlet manifold comprises a bounded chamber having multiple inlets corresponding to each of the multiple heat transfer tubes and one outlet configured to discharge the thermal transfer fluid source.

4. The conditioner of claim 3, wherein each of the multiple heat transfer tubes are welded to the inlet manifold and the outlet manifold.

5. The conditioner of claim 3, wherein each of the multiple heat transfer tubes has a terminal end that projects into the bounded chamber formed by the inlet manifold and an opposite terminal end that projects into the bounded chamber formed by the outlet manifold.

6. The conditioner of claim 1, wherein the inlet manifold and the outlet manifold each comprise a square tube.

7. The conditioner of claim 1, wherein each of the multiple heat transfer tubes has an oval or circular cross-sectional shape.

8. The conditioner of claim 7, wherein the multiple heat transfer tubes are slanted downwardly from the inlet manifold to the outlet manifold.

9. The conditioner of claim 7, wherein at least one of the plurality of heat transfer sections includes a shim under an outer surface of the inlet manifold so that a downward slope is present in the direction of fluid flow.

10. The conditioner of claim 1, wherein the heat transfer tubes in a lower row of tubes are offset perpendicular relative to the heat transfer tubes in an upper row of tubes to provide a tortuous flow path for the granular solid.

11. The conditioner of claim 1, wherein the heat transfer tubes in a lower row of tubes are laterally offset relative to the heat transfer tubes in an upper row of tubes to provide a tortuous flow path for the granular solid.

12. The conditioner of claim 1, wherein at least one of the plurality of heat transfer sections is configured to be flipped such that a position of a top surface and a bottom surface of the multiple heat transfer tubes is reversed.

13. The conditioner of claim 1, wherein the plurality of heat transfer sections comprises at least three heat transfer sections stacked vertically with respect to each.

14. The conditioner of claim 1, wherein each of the plurality of frames is symmetric about at least two planes.

15. The conditioner of claim 1, wherein each of the plurality of frames comprises multiple sections bolted together, and the plurality of heat transfer sections are attached to the respective one of the plurality of frames with bolt connections independent of bolt connections forming the respective one of the plurality of frames.

16. The conditioner of claim 1, wherein a first heat transfer section is connected to a first heat transfer fluid source and a second heat transfer section is connected to a second heat transfer fluid source different than the first heat transfer fluid source.

17. The conditioner of claim 1, wherein at least one heat transfer section includes mounting plates on opposed ends, each mounting plate having bolt hole openings in multiple planes configured to facilitate multiple bolting connections in multiple planes during assembly.

18. The conditioner of claim 1, wherein each of the plurality of heat transfer sections and each of the plurality of frames having corresponding fixation apertures through which a fixation member is inserted to fixedly secure each of the plurality of heat transfer sections to the respective one of the plurality of frames.

19. The conditioner of claim 1, wherein each of the plurality of heat transfer sections comprises mounting plates positioned on opposite ends of each the plurality of heat transfer sections, each mounting plate including at least one bole hole configured for attachment to a corresponding bolt hole on the respective one of the plurality of frames.

20. The conditioner of claim 1, further comprising a sealing member positioned between upper and lower surfaces of adjacent heat transfer sections to seal a junction between the adjacent heat transfer sections.

* * * * *